Nov. 29, 1927.  
T. SATO  
1,651,158  
MACHINE FOR PREPARING PINEAPPLE CROWNS FOR PLANTING  
Filed Jan. 29, 1926  9 Sheets-Sheet 1
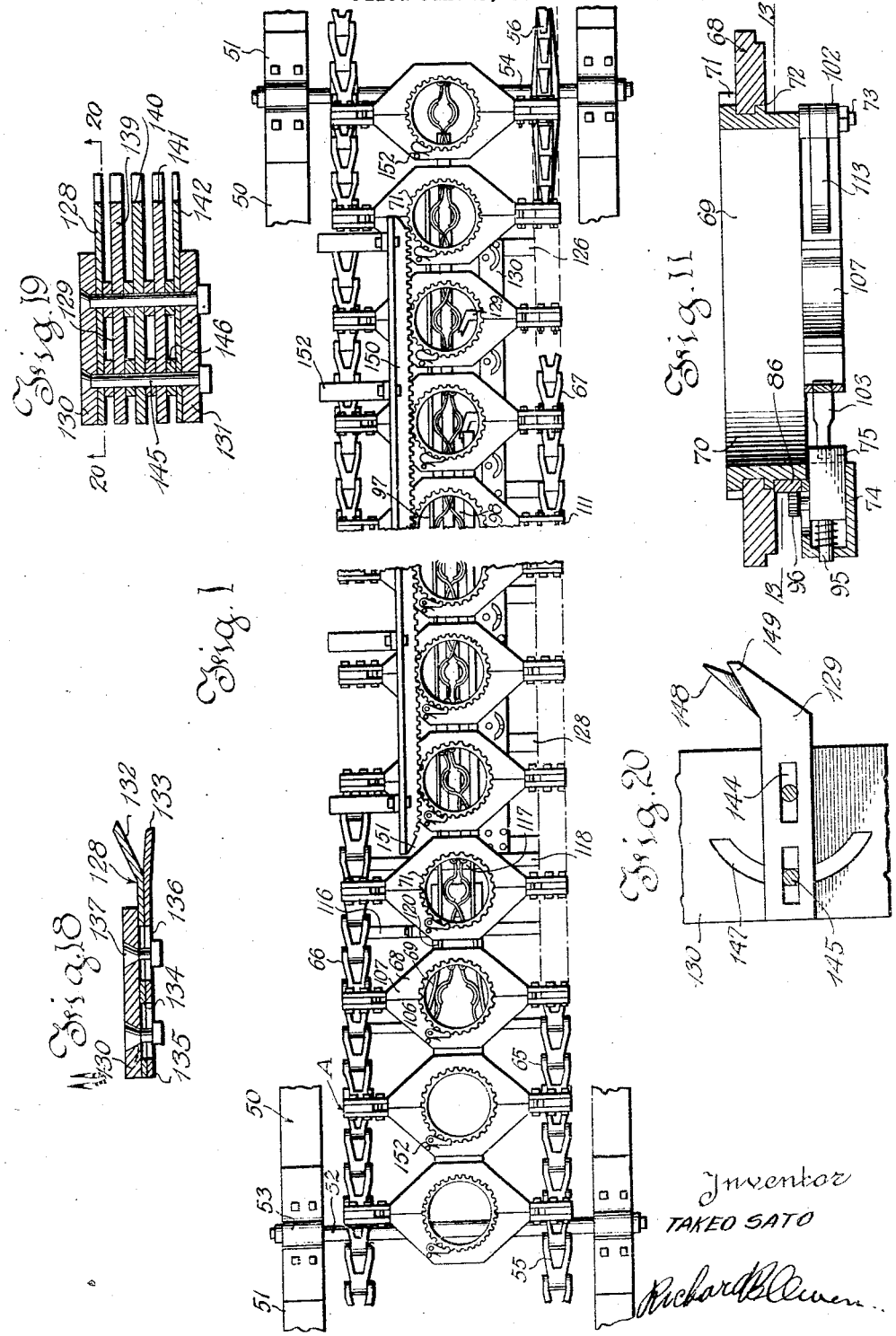

Nov. 29, 1927.  
T. SATO  
1,651,153
MACHINE FOR PREPARING PINEAPPLE CROWNS FOR PLANTING
Filed Jan. 29, 1926    9 Sheets-Sheet 2
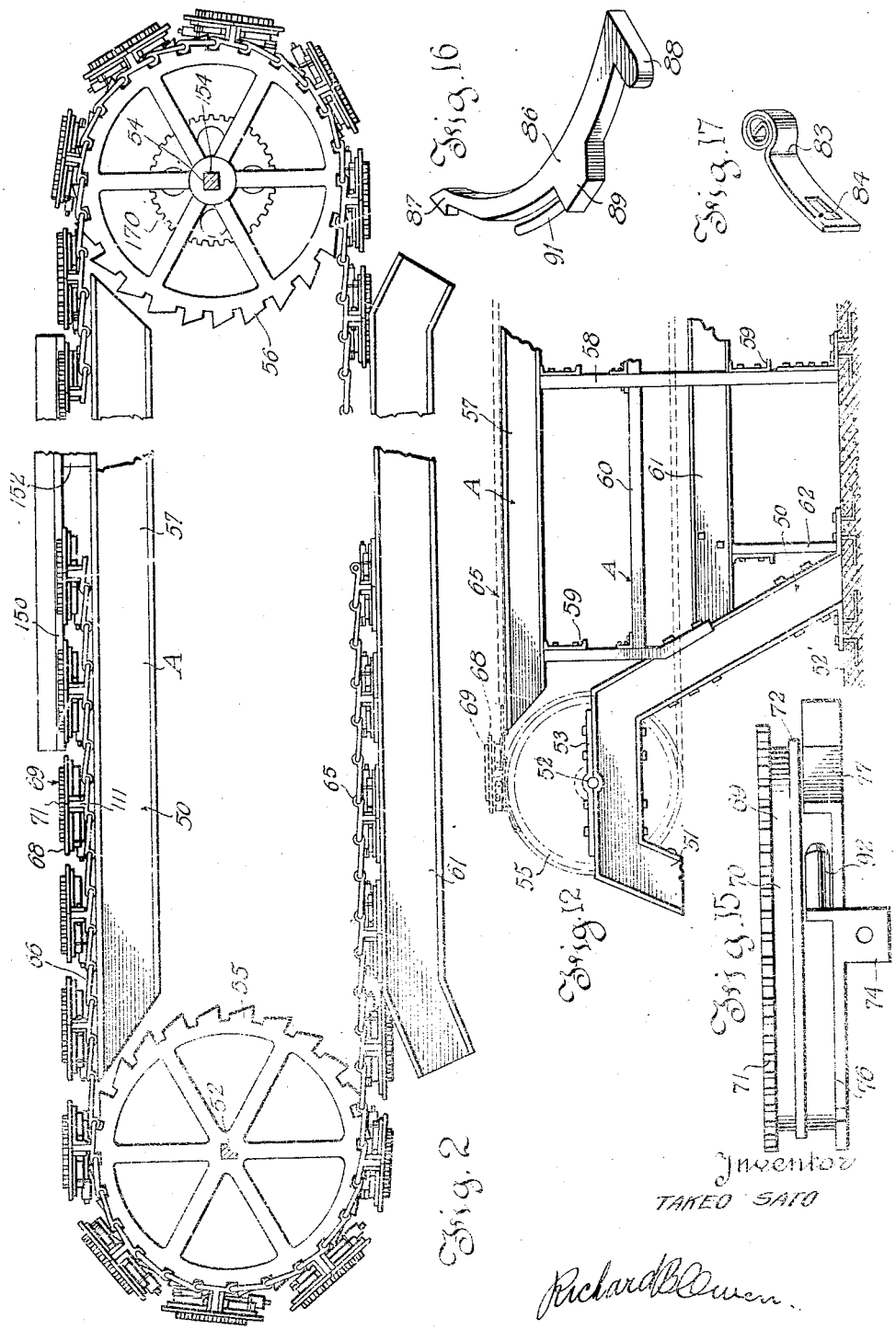

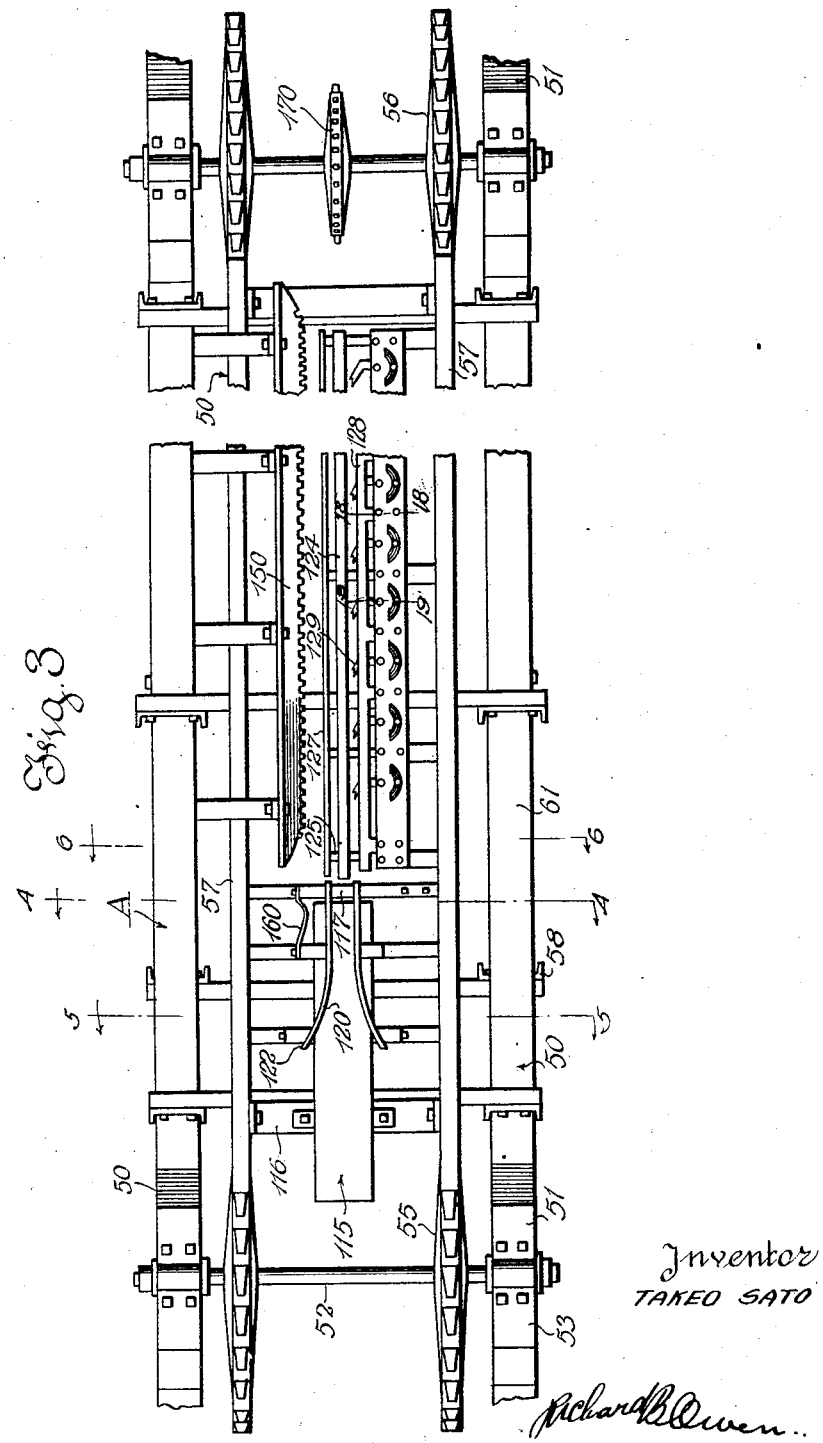

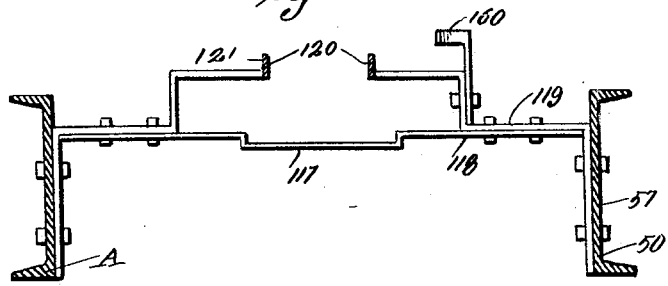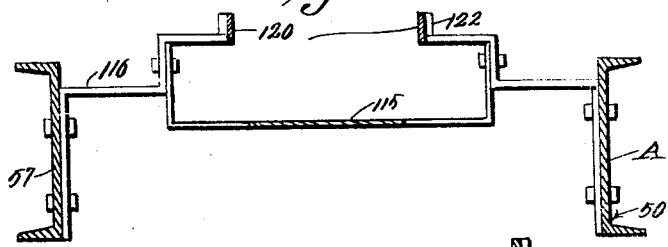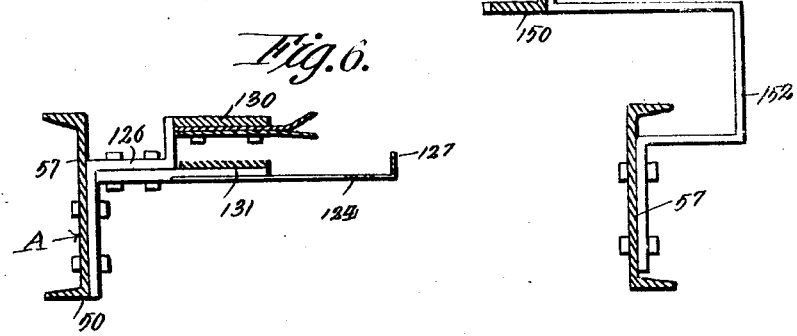

Nov. 29, 1927. 1,651,158
T. SATO
MACHINE FOR PREPARING PINEAPPLE CROWNS FOR PLANTING
Filed Jan. 29, 1926 9 Sheets-Sheet 5
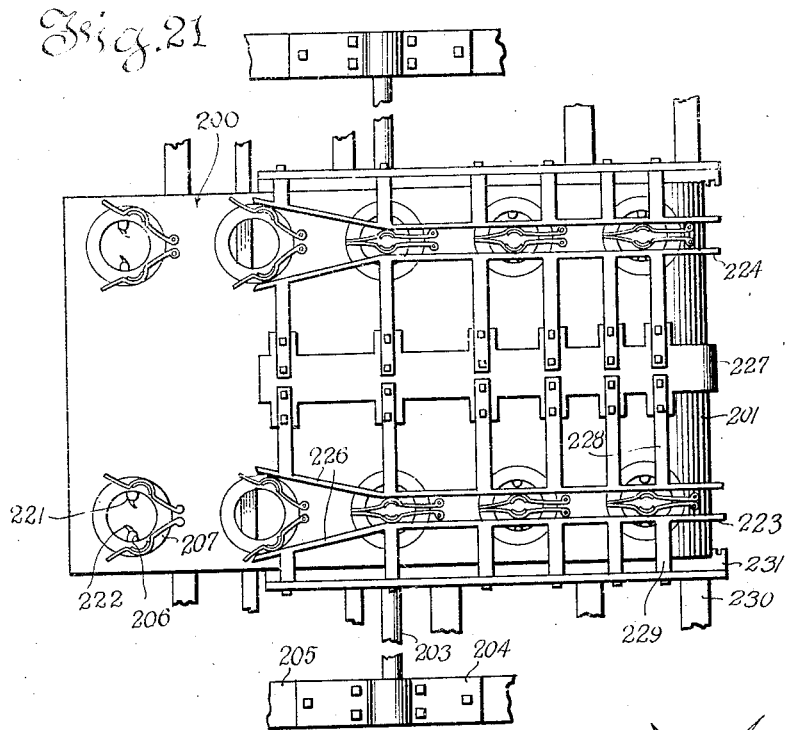
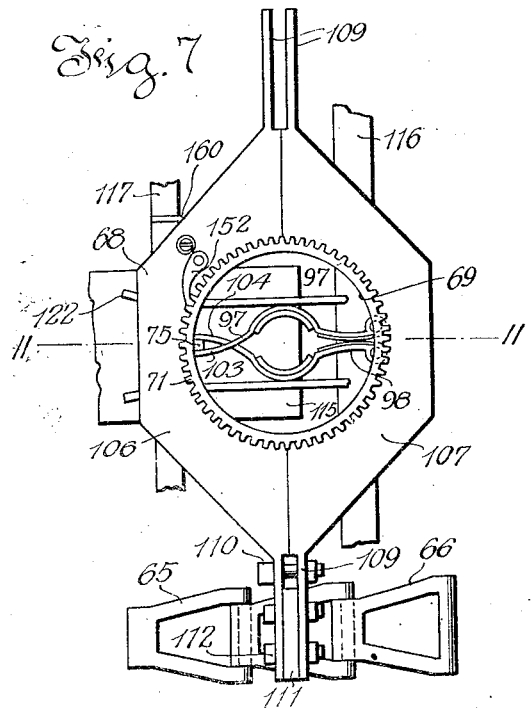
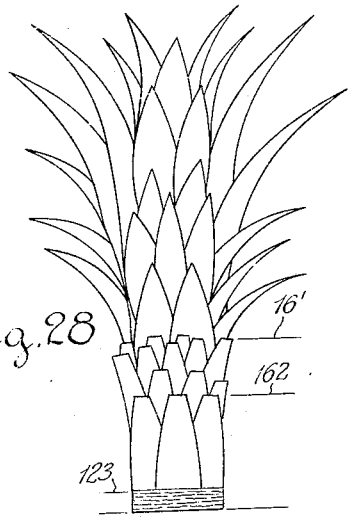
Inventor
TAKEO SATO Nov. 29, 1927.  
T. SATO  
1,651,158  
MACHINE FOR PREPARING PINEAPPLE CROWNS FOR PLANTING  
Filed Jan. 29, 1926  
9 Sheets-Sheet 6
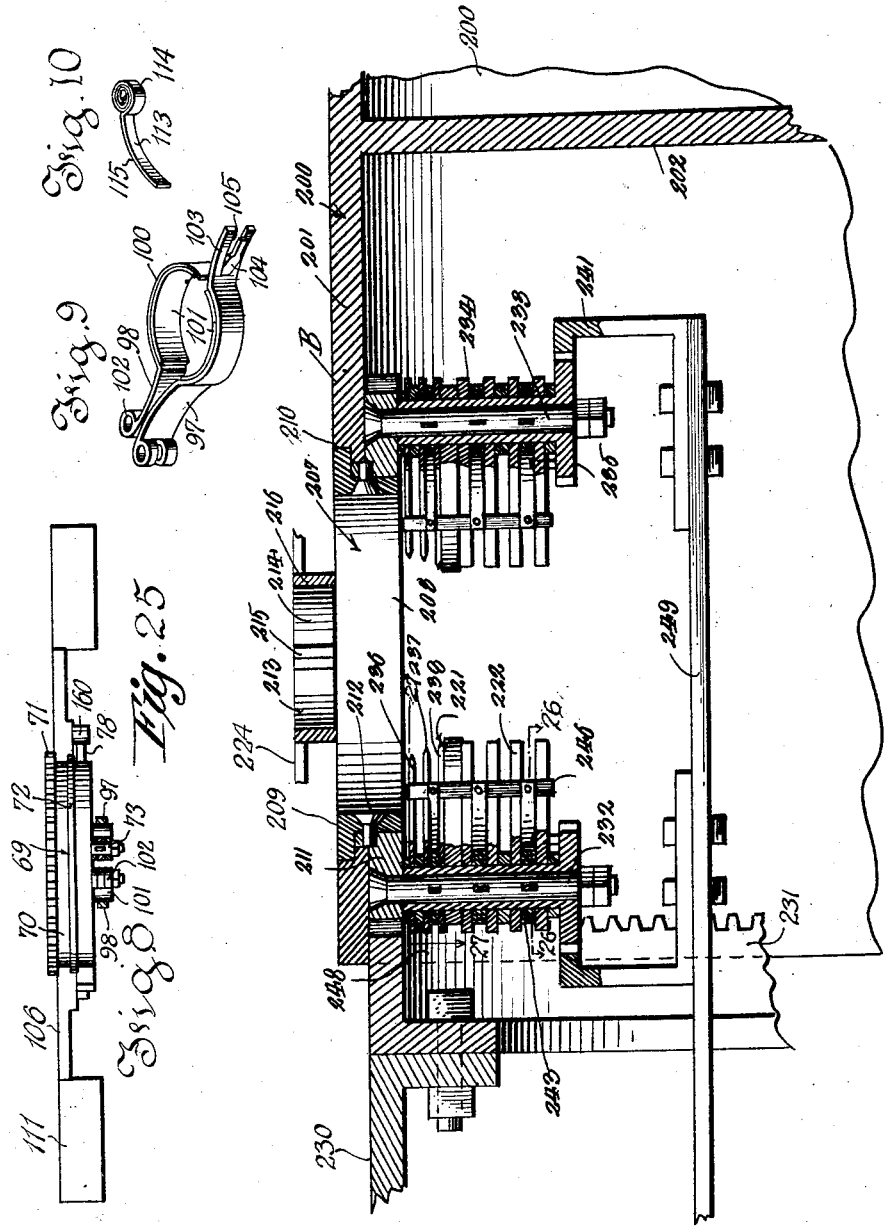
WITNESSES  
Inventor  
TAKEO SATO Nov. 29, 1927.　　　　　　　　　　　　　　　　　　1,651,158
T. SATO
MACHINE FOR PREPARING PINEAPPLE CROWNS FOR PLANTING
Filed Jan. 29, 1926　　　9 Sheets-Sheet 7

WITNESSES

Inventor
TAKEO SATO
By Richard B. Owen
Attorney

Nov. 29, 1927.  1,651,158
T. SATO
MACHINE FOR PREPARING PINEAPPLE CROWNS FOR PLANTING
Filed Jan. 29, 1926    9 Sheets-Sheet 8
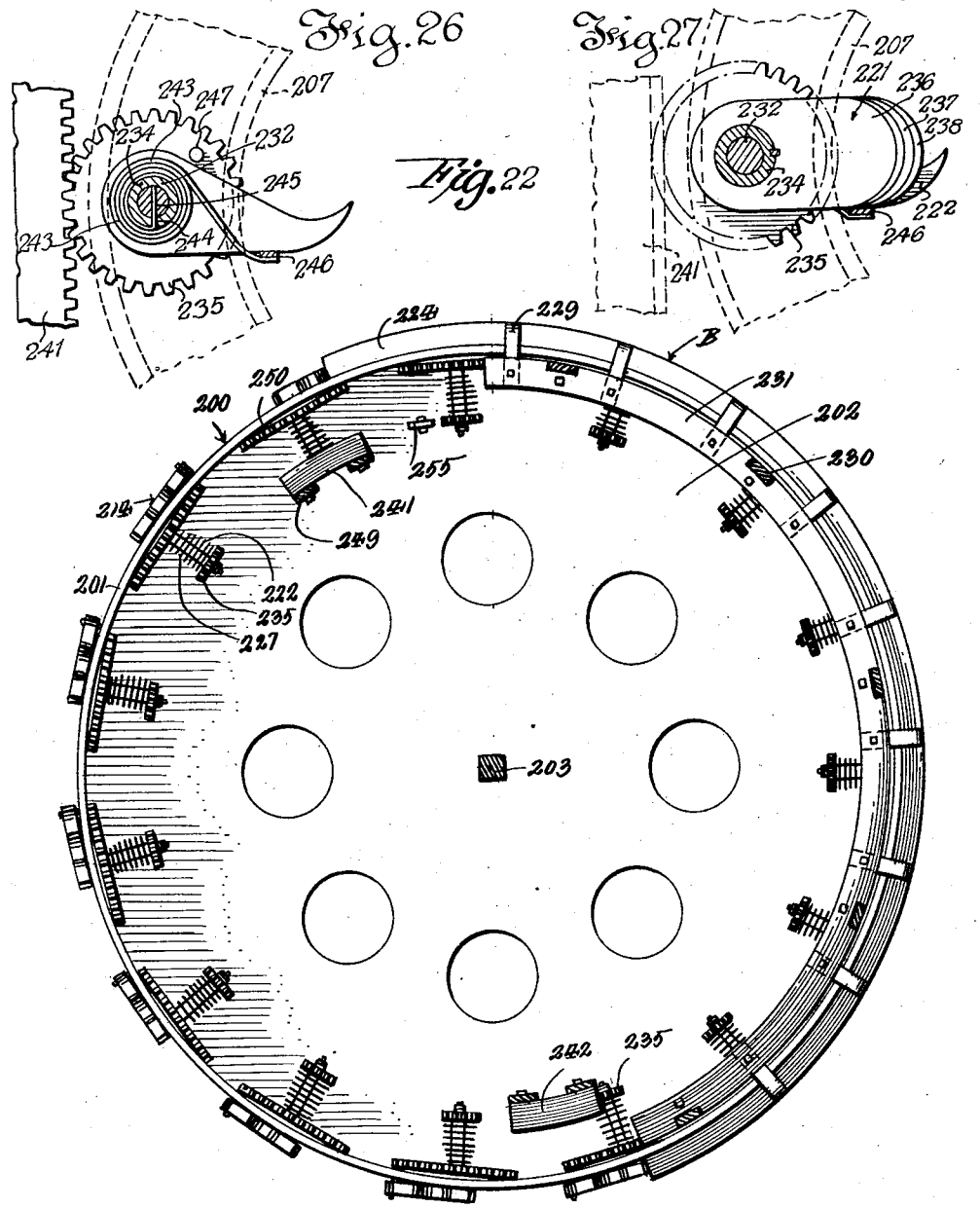
WITNESSES
Inventor
TAKEO SATO
By Richard B. Owen
Attorney Nov. 29, 1927.
T. SATO
1,651,158
MACHINE FOR PREPARING PINEAPPLE CROWNS FOR PLANTING
Filed Jan. 29, 1926     9 Sheets-Sheet 9
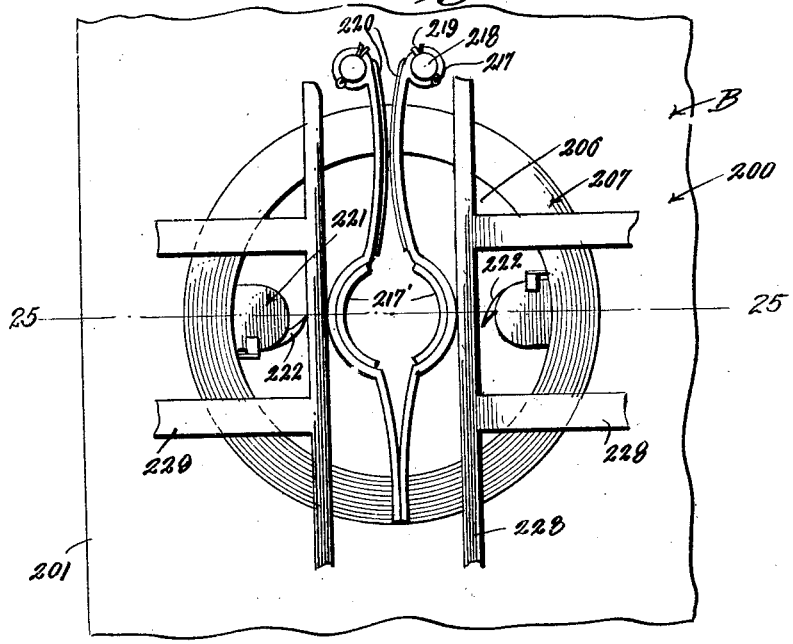
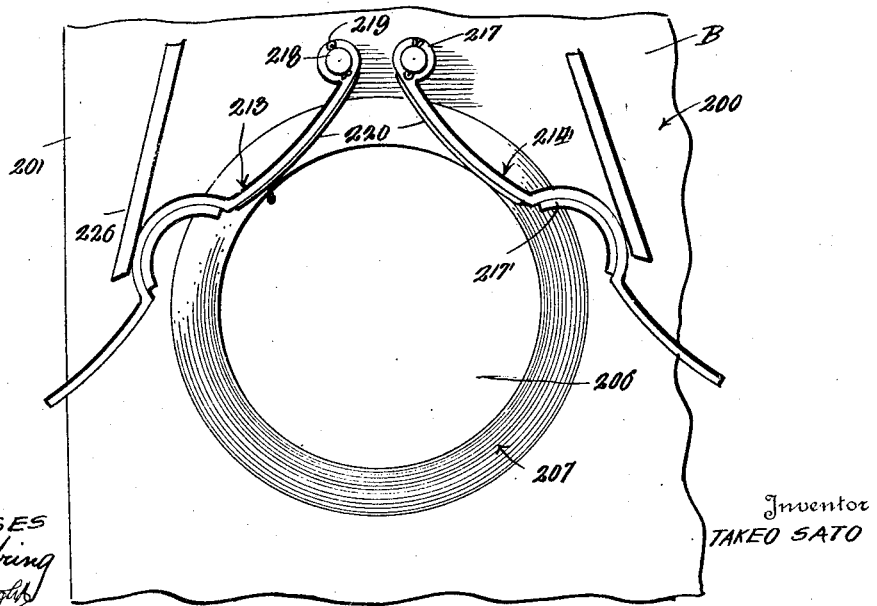
Inventor
TAKEO SATO
WITNESSES
By Richard B. Owen
Attorney Patented Nov. 29, 1927.

1,651,158

UNITED STATES PATENT OFFICE.

TAKEO SATO, OF HONOLULU, TERRITORY OF HAWAII.

MACHINE FOR PREPARING PINEAPPLE CROWNS FOR PLANTING.

Application filed January 29, 1926. Serial No. 84,753.

This invention relates to pineapple culture and more particularly for treating the crowns of pineapples preparatory to planting thereof.

In planting pineapples, it is customary to sever the crowns from the fruit after which the lower leaves of the crowns are stripped therefrom and the crowns are trimmed, so as to expose the hearts thereof (the so called seed). After this operation, the crowns are ready for planting. Considerable difficulty has been experienced in the stripping of the leaves from the crowns and the trimming of the crowns and these operations have heretofore been accomplished by hand. This hand operation requires considerable time and effort and involves the expenditure of a considerable amount of money.

It is therefore the primary object of this invention to provide a machine for receiving the pineapple crowns and for cutting and trimming the same mechanically, and thereby dispense with the difficulty heretofore experienced in the treating of the pineapple crowns, preparatory to the planting thereof.

Another object of the invention is to provide a pineapple crown cutting and trimming machine having novel means for receiving the pineapple crowns and for holding the crowns fast in the machine during the cutting and trimming operation.

A further object of the invention is the provision of a pineapple cutting and trimming machine embodying an endless carrier having associated therewith rotatable pineapple crown receiving cylinders with novel means for releasably locking the crowns within the cylinders during the cutting and trimming operations, with novel means for rotating the cylinders during the travel of the endless member.

A further object of the invention is the provision of novel means for trimming the base of the crowns of the pineapples while the pineapples are locked within the rotatable cylinders.

A further object of the invention is the provision of novel means for cutting the pineapple crowns circumferentially at a point spaced from the base thereof during the rotation of the cylinders and novel hooks for engaging the crowns below the circumferential cuts so as to effectively strip the leaves from the crown so as to expose the heart or seed thereof.

A further object of the invention is the provision of novel means for mounting the hooks and the knives, for providing the circumferential cuts on the machine, so that these parts will be readily accessible and easy to adjust relative to the crowns so as to insure the proper stripping thereof.

A further object of the invention is the provision of novel means for releasing the pineapple crowns from the cylinders after the trimming or stripping operation, so as to permit the same to drop from the machine by gravity.

A still further object of the invention is the provision of a novel pineapple crown trimming and cutting machine of the above character, which will be durable and efficient in use, one that will be comparatively simple and easy to manufacture and one which can be placed upon the market and operated at a reasonable cost.

With these and other objects in view, the invention consists in the novel construction, arrangement and formation of parts, as will be hereinafter more specifically described, claimed and illustrated in the accompanying drawings, in which drawings:

Figure 1 is a fragmentary top plan view of the improved machine,

Figure 2 is a fragmentary side elevation of the machine with parts thereof broken away and in section, Figure 3 is a fragmentary top plan view of the machine with the endless conveyor removed to illustrate the novel arrangement of the cutting knives and hooks and the operating track for the rotatable cylinders, Figure 4 is a detail transverse section through the machine taken on the line 4—4 of Figure 3 illustrating the novel means for closing the pineapple crown engaging jaws and the operating trip for the lock thereof, Figure 5 is a detail transverse section taken on the line 5—5 of Figure 3 showing the means for moving the crown engaging jaws in their closed position and the means for supporting the crown preparatory to the gripping thereof, Figure 6 is a transverse section taken on the line 6—6 of Figure 3, Figure 7 is an enlarged top plan view of one of the rotatable cylinders for a pineapple crown and the carrying or supporting block therefor, the view also illustrating the means of connecting the supporting block with the conveyor chains, Figure 8 is an end elevation of one of the cylinders showing the same in position on its supporting block and illustrating the means of connecting the crown clamping arms in place, Figure 9 is a detail perspective view of the clamping arms or jaws of the pineapple crown, Figure 10 is a detail perspective view of one of the springs utilized for normally urging the crown clamping jaws to their open position, Figure 11 is a diametric section through one of the cylinders and supporting block taken on the line 11—11 of Figure 7 illustrating the jaws in their clamped holding position, Figure 12 is a fragmentary side elevation partly in section illustrating the novel framework for the machine.

Figure 13 is a horizontal section taken on the line 13—13 of Figure 11, showing the crown clamping jaws in their locked position and the locking jaws being released by the dog trip, Figure 14 is a similar view showing the jaws in their open position with the bolt operating member moved to its bolt operating position by the frame carried trip, Figure 15 is a side elevation of the cylinder showing the support and casing for the bolt operating member of the locking dog, Figure 16 is a detail perspective view of the bolt operating member, Figure 17 is a detail perspective view of the spring for the locking dog, Figure 18 is a detail transverse section taken on the line 18—18 of Figure 3 showing the means of mounting the knives in place and for permitting the adjustment thereof relative to the crown, Figure 19 is a detail transverse section taken on the line 19—19 of Figure 3 illustrating the means of mounting the stripping or trimming hooks in place.

Figure 20 is a detail horizontal section taken on the line 20—20 of Figure 19 showing the means employed for permitting the adjustment of the stripping or trimming hooks, Figure 21 is a top plan view of a modified type of the machine, Figure 22 is a sectional view showing the supporting drum in side elevation, Figure 23 is a large fragmentary top plan view illustrating one of the cylinders and the crown carrying jaws, showing the jaws in their locked position and the knives and stripping or trimming hooks in place for engaging the crown, Figure 24 is a similar view showing the jaws in their open position and the knives and stripping or trimming hooks open to permit the ready insertion of the crown in place in the cylinder.

Figure 25 is a detail transverse section through the cylinder and drum taken on the line 25—25 of Figure 23.

Figure 26 is a detail section taken on the line 26—26 of Figure 25 illustrating the means of mounting the stripping or trimming hooks in place, Figure 27 is a detail section taken on the line 27—27 of Figure 25 looking in the direction of the arrows illustrating the means of mounting the novel cutting knives in place.

Figure 28 is a side elevation of a pineapple crown after the treatment thereof showing the same trimmed and stripped ready for planting.

Figure 13:
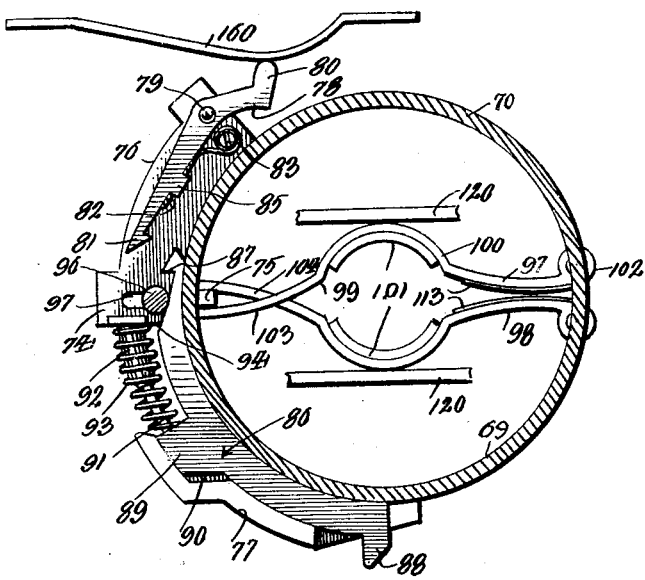

Referring to the drawings in detail, wherein similar reference characters designate corresponding parts throughout the several views the letter A generally indicates one type of the improved pineapple cutting, stripping and trimming machine and the same embodies a supporting frame 50 preferably but not necessarily formed from channel iron. The frame 50 at each end thereof embodies side supporting standards or supports 51, which as shown are formed from channel iron and these standards have their lower ends anchored or otherwise secured to a concrete base 52'. The standards 51 arranged at one end of the frame rotatably supports a shaft 52 and suitable bearings 53 are provided therefor. The standards 51 at the opposite end of the machine supports a similar shaft 54. These shafts 52 and 54 have keyed or otherwise secured thereto, pairs of sprocket wheels 55 and 56 respectively, as clearly shown in the drawings for a purpose, which will be hereinafter more specifically described. Arranged flush with the tops of the pairs of sprocket wheels 55 and 56 are longitudinally extending channel irons 57 which are supported by standards 58 which can be formed from angle iron. These standards 58 are braced by transverse channel beams 59. The standards 58 can be further braced by longitudinally extending struts 60 as clearly shown. Lower spaced channel beams 61 are also provided and these channel beams extended longitudinally of the frame and are supported by suitable legs or standards and certain of the channel beams 59 are provided for bracing the standards 58. The frame can be braced in any other desired way as may be desired, as is readily apparent to those skilled in the art.

Figure 14:
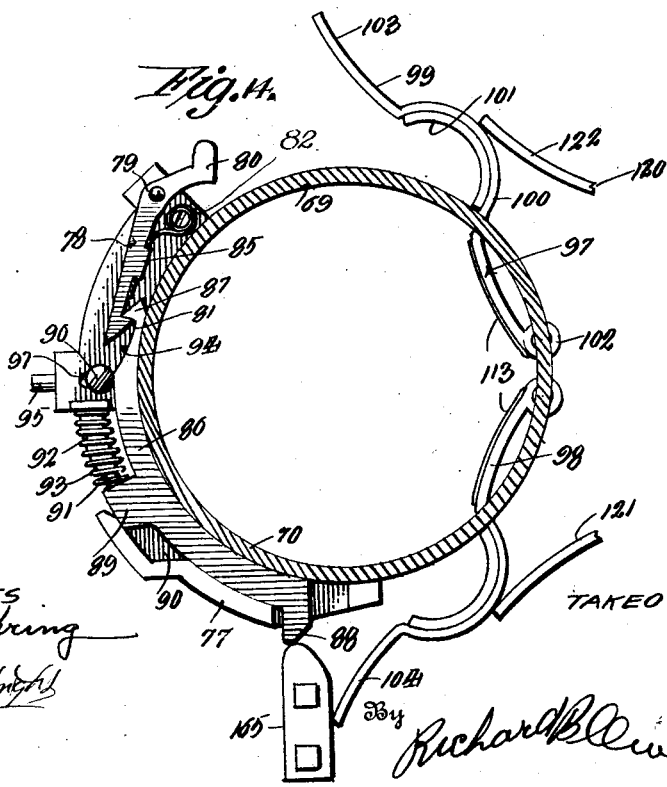

An endless conveyor 65 is arranged to travel longitudinally of the machine and embodies a pair of spaced sprocket chains 66 and 67 which are trained about the pairs of sprocket wheels 55 and 56. These sprocket chains 66 and 67 are connected by transversely extending blocks 68 which form an important part of the present invention and which forms supports for the rotatable cylinders 69 which receive the pineapple crowns. Each of the cylinders 69 embodies an annular body or sleeve 70, the upper end of which is provided with an external ring gear 71 which can be formed directly on the body of the cylinder if preferred. Below the ring gear 71 and spaced a predetermined distance therefrom is an angular retaining rib 72, which is also formed on the outer surface of the body. The lower edge of the body at one side thereof is provided with a pair of depending pivot pins or studs 73 and at a point exactly diametric to said studs 73 and intermediate the same is a depending radially extending casing 74 which forms the housing for the lock bolt 75, which will be hereinafter more fully described. The cylinder and its associate mechanism is clearly shown in Figures 7 to 17 inclusive of the drawings. Formed below the annular flange or rib 72 and directly above the bolt casing 74 is a laterally extending arcuate flange 76 and guide casing 77. The supporting flange 76 is formed on one side of the bolt casing 74 while the guide casing 77 is formed on the other side thereof and the flange 76 forms a support for a pivoted locking dog 78 which is rockably mounted on a pivot pin 79 carried by the said flange. The outer end of the dog 78 is provided with a laterally extending foot 80 for a purpose, which will be hereinafter more fully described, while the inner end of the dog is provided with a locking tooth 81. A leaf spring 82 is provided for normally urging the dog away from the cylinder and this spring 82 is coiled about and achored in place by a suitable bolt or screw 83 while the free end thereof engages the inner face of the dog and is provided with a slot 84 for the reception of a retaining lug 85 formed on the dog to prevent displacement of the spring. The guide casing 77 slidably receives the arcuate bolt operating member 86 which conforms to the configuration of the cylinder and the inner end of this bolt operating member 86 is provided with a locking tooth 87 which is adapted to be engaged by the tooth 81 of the dog as shown in Figure 14 so as to prevent movement of the said bolt operating member and the bolt, as will be hereinafter more fully described. The outer end of the bolt operating member 86 is provided with a laterally extending foot 88 the purpose of which will also be hereinafter more fully described. At a point intermediate the ends of the bolt operating member is a laterally extending stop lug 89 for limiting the sliding movement of the said member and this stop lug is adapted to engage a shoulder formed on the casing. This stop lug also carries an arcuate guide pin 91 which is slidably mounted within an arcuate guide cylinder or sleeve 92 formed on the upper end of the bolt casing 74 and a spring 93 is coiled about the sleeve and pin and functions to normally urge the bolt operating member toward the outer end of its guide casing. The outer face of the bolt operating member adjacent to the tooth 87 thereof is provided with an inclined face leading toward said member as indicated by the reference character 94 which serves as means for operating the bolt 75 during the actuation of the bolt operating member as will be described. It is to be noted that the bolt 75 includes a flat shaped body 76 which is adapted to extend radially into the cylinder from the inner end of the bolt casing 74 and the outer end of this bolt can be provided with a guide pin 95 as clearly shown. The upper edge of the bolt is provided with a headed pin 96 which extends through a slot 97 formed in the bolt casing and the head of the pin is adapted to normally engage the inclined face 94 formed on the said bolt operating member.

When a pineapple crown is placed within the cylinder, the crown is adapted to be grasped and held in an upright position by a pair of locking jaws or bands 97 and 98. These grasping jaws or bands each embody shank portions 99 which have formed thereon intermediate their ends arcuate oppositely bowed jaw faces 100 which can be provided with leather pads or the like 101. The outer ends of the shanks 99 are provided with hinge barrels 102 which are rotatably mounted upon the stud bolts 73 and suitable nuts are employed for holding the bands or jaws in place. The inner ends of the shanks 99 are arcuated to provide oppositely bowed arms 103 and 104 as clearly shown in the drawings. The arm 103 is of a greater width than the arm 104 and is bifurcated or slotted as at 105 so as to receive said arm 104. When the jaws are in their closed grasping positions the arms 103 and 104 will overlap as shown clearly in Figures 9-13 and when the bolt 75 is in its extreme inward position the same is adapted to ride between said arms for holding the same against opening swinging movement.

Again referring to the supporting blocks 68 for the cylinders, it is to be noted that each of the blocks 68 include separable companion parts 106 and 107 and that these companion parts are adapted to meet at the diametric center of a cylinder so as to grip the same. The companion portions 106 and 107 are adapted to engage a cylinder between the ring gear 71 and the spaced rib 72 so that when the said companion portions are held against movement, the cylinders will be prevented from displacement in the said block. The opposite side faces of the companion portions 106 and 107 of the supporting blocks 68 are each provided with laterally extending spaced ears 109 which are adapted to be clamped together by suitable bolts 110. As heretofore intimated the blocks 68 are carried directly by the sprocket chains 67 and 66 and certain of the links of the sprocket chains are provided with outwardly extending blocks 111 which are adapted to be received between the ears 109 formed on the companion portion of the blocks and bolts 112 extend through the ears and lugs for firmly connecting the blocks to the endless sprocket chains. By this construction it can be seen that upon operation of the machine, that the blocks with their cylinders will be conveyed longitudinally of the frame similar to the ordinary flights of a conveyor.

The jaws or bands 97 and 98 are of a somewhat flexible nature and are normally held in an open separated position, so as to admit the introduction of the pineapple crown in the cylinders, by leaf springs 113, and it is to be noted that these springs each embody a coiled barrel portion 114 and the arcuate body portion 115 which engages the inner end of the adjacent jaw. The coiled barrel portions of the springs are coiled about the supporting studs 73 and have the inner ends thereof extended through slots in the studs as clearly indicated in the drawings. The upper runs of the sprocket chains 66 and 67 are adapted to travel on the upper pair of channel beams 57 which support the conveyor and prevent sagging of the upper runs thereof. Directly in advance of the front pair of sprocket wheels 65 is arranged a supporting bed plate 115 which forms means for initially holding the crowns of the pineapples in the cylinders prior to the gripping thereof by the clamping jaws or bands. This bed plate or table 115 is held in place by suitable supporting brackets or straps 116 which have their opposite terminals bolted to the channel beams 57. This supporting bed plate 115 terminates short of the transverse center of the machine and arranged directly in advance of the bed plate and transversely of the frame is the trimming knife 117. This trimming knife is also carried by the channel beam 57 and it is to be noted that the ends of the knife 117 are provided with arms 118 which are bolted to brackets 119 which are utilized for supporting the jaw or band closing guide track 120. This jaw or band closing guide track 120 is arranged above the table or bed plate 115 adjacent to the inner end thereof and this track includes plates 121 which are disposed on each side of the longitudinal center of the table. The forward ends of the plates forming the guide track are flared as at 122 and it is to be noted that as the cylinders ride above the guide track that the flared ends 122 of the track will engage the jaws or bands and force the same slowly together about the crown for holding the same in position within the cylinders. While the jaws are being held by the guide track the crowns will be brought in engagement with the knife 117 which will trim off the bottoms thereof. Disposed directly in front of the knife 117 for trimming the bottom of the pineapple crowns and extending longitudinally of the frame is a second table or supporting bed plate 124. This table or bed plate 124 is of a less width than the first table or bed plate 115 in order to permit the free operation of the circumferential cutting knife and stripping hooks as will be hereinafter more fully described. It is to be noted that this table or bed plate 124 extends from the knife 117 to a point short of the rear end of the machine and this table or bed plate is supported by arms 125 which are bolted to suitable brackets 126 connected with one of the side channel beams 57. The arms 125 also support adjacent to one edge of the bed plate 117 an upstanding guide plate 127 which extends the full length of the said bed plate.

The brackets 126 provide means for also supporting the circumferential cutting knives 128 and the stripping hooks 129. These cutting knives 128 and the stripping hooks 129 are arranged on the opposite side of the bed plate 124 from the guide plate 127 and extend longitudinally of the machine as shown. Novel means is provided for supporting the knives and hooks and for connecting the same to the brackets 126 and this means embodies a pair of spaced horizontally disposed longitudinally extending plates 130 and 131. The longitudinally extending cutting knives 128 are connected solely to the upper plate 130 and these knives are arranged one above the other and include oppositely flared blades 132 and 133. Each of the blades is provided with inwardly extending shanks 134 and 135 respectively which are arranged in overlapping relation and are provided with spaced longitudinally extending slots 136 through which extend supporting bolts 137. The heads of these bolts are preferably countersunk within the top supporting plate 130 and it is obvious that by loosening the bolts that the knives can be adjusted toward or away from the supporting bed plate 124, so as to regulate the cut made on the pineapple crowns.

The stripping hooks 129 are arranged between the upper and lower supporting plates 130 and 131 at spaced points thereof so that the crowns will be engaged successively by the said hooks. As indicated, the hooks 129 each consist of a group of superimposed blades 138, 139, 140, 141, and 142 and each of these blades are provided with inwardly extending shanks 143 which are provided with alined slots 144 through which extend clamping bolts 145. Each of the shanks are held spaced from each other by spacing washers 146 and the bolts extend through these washers as well as through the shanks and the upper and lower holding plates. By loosening the bolts, the shanks can be adjusted inward and outward toward the table or bed plate 124 and the shanks are also adapted to be swung so as to adjust the angle thereof relative to the crowns as the same pass through the machine on the conveyor. To vary the angular adjustment of the shanks, the top and bottom plates 130 and 131 are provided with alined arcuate slots 147 through which extends the outermost bolt of the pair of bolts 145 and thus by loosening the bolts the knives can be swung on the innermost bolt of the pair of bolts 145. Again referring to the hooks it is to be noted that the same extend inwardly at an angle from their shanks and that each is provided with a pair of downwardly bent pulling teeth 148 and 149. The teeth being bent downward positions the hooks directly below the circumferential cutting knives and these knives are arranged directly above the said hooks.

In order to bring about the making of the circumferential cut around the pineapple crowns it is necessary to revolve the cylinders 69 carrying the crowns, so that the crown will make several complete revolutions. This is accomplished by providing a longitudinally extending rack bar 150 which is disposed preferably on the opposite side of the machine from the cutting knives and hooks and this rack bar is arranged above the conveyor belt instead of below the same, as are the said cutting knives and hooks. The opposite ends of the rack bar 150 are inclined as at 151, so as to permit the ready engagement of the ring gears 71 formed on the cylinders 69 with the rack bar and the disengagement thereof from the rack bar as the cylinders pass by the same. The intermeshing of the ring gears with the rack bar will turn the said cylinders and thus the entire area of the pineapple crowns below the cylinder will be cut and stripped. The cylinders are only permitted to revolve in one direction and a pivoted dog 152 carried by each block 68 is provided for engaging the teeth of the ring gear so as to prevent any retrograde movement and these dogs are held in engagement with the ring gears by suitable springs or like elements. As clearly shown in the drawings the rack bar 150 is held in place by substantially U-shaped brackets 153 which are bolted to one of the channel irons 57 and to the said rack bar.

The pineapple crowns are fed into the cylinders from a suitable hopper, conveyor belt or the like directly in advance of the guide tracks 120, and the same rests on the table or bed plate 115 as the belt is carried through the machine. Prior to the engagement of the clamping jaws 97 and 98 with the guide track, the jaws are in their open position as shown in Figure 14 of the drawings and the locking bolt 75 is held in a retracted position by the bolt operator 86 which is likewise held against movement by the locking dog 78 heretofore described. When the jaws engage the guide track the same will be gradually brought toward one another until the bowed arms 106 and 107 are in their overlapped position at which time the pineapple crown is firmly grasped against turning movement. At this time the laterally extending arm of the dog will ride into engagement with the cam shaped dog pusher 160 which is arranged at one side of the track 120 directly in advance of the bottom trimming knife 117. The dog pusher will swing the dog 78 on its pivot away from the bolt operator 86 which will allow inward movement of the bolt between the arms 103 and 104 of the jaws which will effectively hold the jaws in a locked position against accidental opening movement. The pineapple crowns will now be held solely by the jaws and upon further advancement of the belt the crowns will be brought into engagement with the knife 117 which will cut the bottoms thereof off and the crowns ride up on the said plate 124.

The longitudinally extending knife 128 is employed for making the circumferential cut in the pineapple crowns and engage one side of the crowns and as the ring gears engage the rack bar 150 the ring gears will be turned three revolutions during their travel through the machine. This will allow a circular cut to be made at two different points on the crowns as indicated by the reference characters 162 and 161 on Figure 28 of the drawings. The hooks 129 will engage the crown of the pineapple below the cuts as indicated and effectively strip the leaves from the crown and disclose the heart or seed thereof. The diameter of the crown will of course be considerably lessened and the appearance of the crown, as can be seen by referring to Figure 28 of the drawing, after the stripping and trimming operation will be considerably altered. The cylinders will carry the crowns over the rear pair of sprocket wheels 56 and at a point below the sprocket wheels and slightly in advance of the same. The dog operating member 86 will be engaged by a trip lug 165 which is connected to one of the lower side beams 61. This trip is arranged in the path of the lug 88 formed on the member 86 and this member will be pushed inward by the said trip until the same is engaged by the dog 78, which will hold the said operating member in a locked position. The inward sliding movement of the operating member will force the locking bolt 75 outward of the cylinder due to the riding of the head 96 on the inclined face 94 of the said operating member which will release the jaws and the same will open. The cylinders will again be ready for receiving the crowns and as soon as the dog 78 is operated by the dog tripper 160 the operating member 86 will slide away from the dog under influence of the spring 93 allowing the bolt 75 to again engage the arcuate arms 103 and 104 of the clamping jaws or crown engaging bands. It is to be noted at this point that as soon as the dog rides past the dog pusher that the same will assume the position shown in Figure 7 for locking the operating member 86 when the same comes in engagement therewith. The machine can be driven in any preferred way and as shown the rear shaft 64 is provided with a drive sprocket wheel 170 which will be connected with any suitable source of power.

In Figures 22 to 27 inclusive I have shown a slightly modified form of invention generally indicated by the reference character B in which the endless conveyor or belt is replaced by a rotary drum 200. This drum 200 is of a considerable size in diameter and embodies an annular rim or shell 201, and a central hub plate 202, which is secured in any preferred way to the drive shaft 203. This drive shaft 203 is rotatably mounted in suitable bearings 204 carried by standards 205 which can be braced in any preferred way and anchored to a concrete base if desired. The standards 205 and the bracing means therefor forms the frame for the machine and as this frame can be constructed in any desired manner the same has not been shown in detail.

On each side of the hub plate 202 is arranged an annular row of openings 206 which extends circumferentially about the rim or shell of the drum. These openings 206 are adapted to rotatably receive the cylinders 207, which are provided for the pineapple crowns.

These cylinders 207 are of a novel construction and each embody the annular body 208 and a radially extending flange 209. The walls of the openings 206 can be rabbeted as at 210 for receiving the flanges 209 so that the outer faces of the cylinders 207 will be flush with the periphery of the drum. In order to hold the cylinders against accidental movement inwardly or outwardly of the drum but to still permit the rotation thereof, an annular retaining ring 211 is provided. The rings 211 are placed in engagement with the drum and are detachably secured to the bodies 208 of the cylinders by suitable bolts or the like 212.

In this form of the invention the pineapple crowns are held within the cylinders against rotation while the cylinders rotate about the same.

The means utilized for holding the pineapple crowns stationary within the cylinders 207 embodies pairs of clamping jaws 213 and 214 which are adapted to extend diametrically across the cylinders when the same are in their clamping positions. Each pair of the jaws 213 and 214 embodies elongated substantially arcuate shanks 215 having oppositely bowed portions at a point intermediate their ends to define clamping jaw faces 216 for engaging the crowns. The inner faces of these jaws are provided with gripping members such as rubber pads or the like 217'. One terminal of each jaw of each pair of jaws is provided with a barrel 217 and these barrels are rotatably mounted upon stud pins 218 secured to the periphery of the drum adjacent to the cylinders in any preferred way. These barrels are prevented from riding off of the stud pins 218 by any preferred means, such as by cotter pins 219 as shown. Jaws 213 and 214 of each pair are adapted to be normally held in a spread condition away from each other, to permit the ready insertion of the pineapple crown within the cylinders, by means of springs 220 which have coiled barrel portions placed around the stud pins 218 and outwardly extending body portions which engage the shanks of the jaws. These jaws are adapted to be maintained in closed crown gripping position for substantially a distance of one half of the circumference of the drum, so as to permit the cutting knives 221 and the stripping hooks 222 to engage and operate upon the pineapple crowns. The means for holding the jaws in their closed gripping positions embodies the pairs of spaced guide tracks 223 and 224. These pairs of guide tracks 223 and 224 are arranged on the opposite sides of the hub plate 202 and are of a substantially semi-circular form and extend approximately about one-half of the drum. Each pair of the guide tracks is so arranged as to extend about the portion of the drum provided with the openings 206 in such a manner as to permit one track of each pair of tracks to lie on opposite sides of the diametric center of the cylinders 207 and the openings 206. The forward ends of the pairs of tracks are flared as at 226 so that as the clamping jaws ride into the tracks the jaws will gradually move to their clamping position.

In order to hold the pairs of guide tracks 223 and 224 in place a centrally disposed arcuate supporting plate 227 is provided. This plate 227 is secured adjacent to its lower end to the supporting frame in any desired way and the opposite edges thereof have bolted thereto laterally extending transversely disposed arms 228 which can be formed on or secured to the inner track of each pair of tracks as clearly shown in the drawings. The outer track of each pair of tracks has secured thereto or formed thereon outwardly extending arms 229 which are bolted or otherwise secured to brackets 230, which are in turn secured in any desired way to the supporting frame for the drum. It is to be also noted at this point that the brackets 229 also support an arcuate rack bar 231 which also is of a substantially semicircular form. This arcuate rack bar 231 extends into the drum directly inward of the pair of guide tracks 223 and 224 as clearly shown in the drawings.

Referring back to the cutting knives 221 and the stripping hooks 222 it is to be noted that a set of the knives and a set of the hooks are carried on each side of each cylinder and that the sets are arranged at diametrically opposed points with respect to one another and at quarters relative to the clamps or jaws.

Depending stud bolts 232 and 233 are secured to the opposite sides of the ring 211 which is carried by each cylinder and these studs have rotatably mounted thereon hollow shafts 234. The hollow shafts 234 can be held against accidental displacement on the stud bolts by any preferred means such as lock nuts or the like. Each set of knives 221 embodies an upper knife blade 236 a lower knife blade 238 and an intermediate knife blade 237. These blades gradually increase in length toward the lowermost blade as clearly shown in Figures 25 and 27 of the drawings. It is to be noted that the knife blades are mounted adjacent to the inner faces of the rings 211 while the sets of hooks 222 are arranged inward of the knives and each set of hooks include a plurality of spaced members for engaging the pineapple crowns at spaced points to insure the stripping and trimming thereof below the series of circumferential cuts made thereon by the sets of knives 221. The lower terminals of the hollow shafts 234 have secured thereto or formed thereon spur gear wheels 235 which are adapted to mesh with the short lengths of rack bars 241 and 242 which will be hereinafter more fully described.

In order to normally hold the sets of hooks and knives in their operative cutting and stripping and trimming positions, that is projecting into the cylinders from the opposite sides thereof a series of coil springs 243 are provided. These springs are placed about the hollow shafts 234 between certain of the knives and hooks of the sets of knives and hooks and have their inner ends provided with diametrically extending shanks 244 which are extended through slots in the hollow shafts and into diametrically extending ways 245 formed in the depending studs 232 and 233. The outer ends of the springs are brought between the knives and hooks toward one end thereof and are secured to a pusher plate or strap 246 which engages all of the knives and hooks for normally urging the same in one direction toward the pineapple crowns. A stop pin 247 is carried by each spur gear 235 and is disposed in the path of the lowermost portion of the said hooks so as to limit the swinging movement thereof under the influence of the springs. The springs normally tend to separate the hooks and the hooks and knives which are not held spaced by the springs have suitable spacing washers 248 arranged between the same as clearly shown in Figure 25 of the drawings. The short rack bar sections can be bolted or otherwise secured to the bracket arms 249 which can be in turn connected with the supporting frame for the drum. The periphery of each retaining ring 211 for the cylinders 207 have formed thereon or secured thereto ring gears 250 and the rack bars 231 are arranged in the path of the ring gears so that the cylinders will be rotated as the same move past the said rack bars. This of course will turn the cutting knives and hooks about the pineapple crowns as the same are held stationary by the clamping jaws. The drum can be rotated in any preferred way and its drive shaft 203 can be connected in any desired way to a suitable prime mover or other source of power.

In operation of the improved device the pineapple crowns are fed one at a time into the cylinders just in advance of the flared portions 226 of the pairs of guide tracks 223. At this time the crowns will be brought into engagement with the transversely extending knife 255 which extends into the drum on each side of the hub plate 202 thereof and thus the bottoms of the crowns will be severed. As the cylinders are now advanced by the rotation of the drums, the clamping jaws will be moved to their clamping position by the pairs of guide tracks and the crowns will be firmly held against movement. As stated the crowns are fed into the cylinders in advance of the guide tracks 223 and just in advance of the short upper pairs of rack bars 241 and engagement of the spur gears 235 with the rack bar sections will swing the knives and hooks a quarter of a revolution into engagement with the pineapple crown and hold the pineapple crown temporarily while the lower ends thereof are severed by the knife 255. The cylinders will make a number of complete revolutions while the same are passing between the guide tracks and the rack bar 231 so that the knives and hooks will completely strip or trim the lower end of the crowns to expose the heart or seed thereof. It is to be understood that the sets of knives will make a series of spaced circumferential cuts entirely about the pineapple crowns at a point spaced from the lower ends thereof so that the hooks will be permitted to readily strip and trim the leaves from off of said crowns. By the time the cylinders have reached the bottom end of the rack bar 231 and the pairs of guide tracks 223, the pineapple crowns will be completely trimmed and stripped and the spur gears 235 will mesh with the lower short rack bars 242 which will again turn the sets of knives and hooks a quarter of a revolution against the tension of the springs which will allow the crowns to fall from out of the cylinders by gravity. The crowns can be caught in suitable receptacles or a conveyor belt can be placed under the drum so as to carry the treated crowns to the desired points. As soon as the spur gears 35 pass the rack sections 242 the same will again move to their operative positions and remain in such positions until the spur gears are again acted upon by the upper rack bars 241 which will tend to swing the knives and hooks to their open position to allow the immediate insertion of new pineapple crowns.

From the foregoing description, it can be seen that a novel and complete machine has been provided for effectively trimming and stripping pineapple crowns to expose the heart or seed thereof, which has heretofore been accomplished solely by hand labor.

Changes in details may be made without departing from the spirit or the scope of this invention, but:

What I claim as new is:

1. A machine for preparing pineapple crowns for planting comprising means for conveying the pineapple crowns through the machine and means for cutting and stripping the crowns during the travel thereof through the machine.

2. A machine for preparing pineapple crowns for planting comprising a frame, means supported upon the frame for conveying the pineapple crowns through the machine, means for initially trimming the bases of the crowns during the travel of the crowns through the machine and means for cutting and stripping the leaves of the crowns directly above the base thereof during the said travel of the crowns.

3. A machine for preparing pineapple crowns for planting comprising means for conveying the pineapple crowns through the machine, means for initially cutting the bases of the crowns at the start of the travel of the crowns through the machine, means for cutting the crowns circumferentially at a point spaced from the bases thereof during the travel of the crowns through the machine and means for stripping the crowns during the cutting operation and the travel of the crowns through the machine.

4. A machine for preparing pineapple crowns for planting comprising a frame, means supported upon the frame for conveying the crowns through the machine, means for releasably locking the pineapple crowns upon the conveying means during a portion of the travel of said conveyor, means for trimming off the bases of the crowns initially at the start of the travel of the conveying means, knives arranged in rear of the base trimming knife for cutting the crowns at a point spaced from the bases thereof circumferentially, and a plurality of spaced hooks for stripping the crowns between the circumferential cut and the bases.

5. A machine for preparing pineapple crowns for planting comprising a frame, means supported upon the frame for conveying the crowns through the machine, means mounted upon said conveying means for releasably gripping the crowns, a knife for engaging the crowns and cutting the bases thereof off during the travel of said conveying means, a plurality of knives arranged in rear of the first mentioned knife for providing a series of circumferential cuts around the crowns at a point spaced from the lower end thereof, and a series of sets of stripping hooks arranged at spaced points for stripping the crowns intermediate the inner ends thereof and the circumferential cuts.

6. A machine for preparing pineapple crowns for planting comprising a frame, means for conveying the pineapple crowns through the machine arranged upon said frame, means for releasably locking the crowns upon the conveying means for a portion of the travel thereof, a knife for trimming the bases at a point adjacent to the bottoms thereof, a plurality of knives arranged inwardly of the first mentioned knife for cutting the crowns circumferentially at a point spaced from the bases thereof, and a plurality of sets of spaced stripping hooks arranged below the second mentioned knives for stripping the crowns between the bases thereof and said circumferential cuts.

7. A machine for preparing pineapple crowns for planting comprising a frame, means for conveying the pineapple crowns through the machine, a plurality of clamping jaws carried by said conveying means for gripping the pineapple crowns, means for releasably holding said gripping means in engagement with the pineapple crowns for a portion of the travel of said conveying means, means including a knife for cutting off of the bases of the pineapple crowns at the start of the travel of the crown on the conveying means, means arranged on each side of the crowns including a plurality of knives for cutting the crowns circumferentially at a point above the bases thereof, and means including a plurality of sets of hooks arranged on each side of the crowns and inward of the plurality of knives for stripping the crowns at a point above the bases and inward of the cut made by the plurality of knives.

8. A machine for preparing pineapple crowns for planting comprising a frame, means for conveying the pineapple crowns through the machine arranged upon said frame, rotatable cylinders mounted upon the conveying means for receiving the crowns, clamping jaws associated with the conveying means for holding the crowns within the cylinders, releasable means for locking the jaws in engagement with the crowns for a portion of the travel of said conveying means, knives arranged on opposite sides of the cylinders for cutting the crowns circumferentially at a point above their bases during the travel of the crowns through the machine, and a plurality of sets of stripping hooks associated with the machine inward of said plurality of knives for stripping the crowns between the bases and the circumferential cuts.

9. A machine for preparing pineapple crowns for planting comprising a frame, means supported upon the same for conveying the crowns through the machine, a plurality of rotatable cylinders supported by said conveying means for receiving the crowns, means for releasably locking the crowns within the cylinders, and means for cutting and stripping the crowns in the cylinders while the same are locked therein and during the travel of the conveying means through the machine.

10. A machine for preparing pineapple crowns for planting comprising a frame, means supported upon the frame for conveying the pineapple crowns through the machine, a plurality of spaced rotatable cylinders supported upon the conveying means for receiving the crowns, pivoted clamping jaws carried by the cylinders, means for moving the jaws into clamping engagement with the crowns, means for releasing the jaws from clamping engagement with the crowns at a predetermined time, and cutting and stripping means for the pineapple crowns arranged between the means for locking the jaws in engagement with the crowns and for releasing said locking means.

11. A machine for preparing pineapple crowns for planting comprising a frame, means supported upon the frame for conveying the crowns through the machine, a plurality of pairs of pivoted gripping jaws associated with the said conveying means for engaging the crowns, means for moving the gripping jaws to a pineapple crown gripping position, means for releasing the jaws to permit the releasing of the pineapple crowns arranged at a point spaced from the means for moving the jaws to their gripping position and means arranged between the jaw closing means and the jaw releasing means for cutting and stripping the said crowns during the travel of the crowns through the machine on said conveying means.

12. A machine for preparing pineapple crowns for planting comprising a frame, means supported upon the frame for conveying the crowns through the machine, a plurality of spaced rotatable cylinders mounted upon the conveying means, means for rotating the cylinders during a portion of the travel of said conveying means, means for locking the crowns within the cylinders during the rotation thereof, longitudinally extending knives arranged upon the frame for engaging the crowns and cutting the same during the rotation thereof, and hooks supported upon the frame inward of said knives acting upon the pineapple crowns below the cut portions thereof.

13. A machine for preparing pineapple crowns for planting comprising a frame, means supported upon the frame for conveying the crowns through the machine, a plurality of spaced rotatable cylinders carried by said conveying means for receiving the pineapple crowns, means for rotating said cylinders during a portion of the travel of said conveying means through the machine, means for releasably locking the crowns within the cylinders during the rotation thereof, means for preventing retrograde movement of said cylinders, a transversely extending stationary knife arranged inward of the cylinders and in advance of the cylinder rotating means for trimming off the bases of the crowns, spaced longitudinally extending knives supported upon the frame arranged on opposite sides of the cylinders for engaging the crowns during the rotation thereof for cutting the same circumferentially at a point spaced from the bases thereof, and a plurality of sets of stripping hooks mounted inward of said longitudinally extending knives for acting upon said crowns while the same are locked in place for stripping said crowns to expose the hearts thereof.

14. A machine for preparing pineapple crowns for planting comprising a frame, means supported upon the frame for conveying the crowns through the machine, a plurality of spaced rotatable cylinders mounted upon said conveying means for receiving the crowns, means for rotating said cylinders for a portion of the length of travel of said conveying means, means for locking the crowns in the cylinders during the rotation of the cylinders, a table arranged to initially support the crowns prior to the locking of the crowns in the cylinders during the initial placing of the crowns in the cylinders, a transversely extending knife arranged inward of the cylinders for trimming off the bases of the pineapples, longitudinally extending knives disposed inward of the cylinders for cutting the crowns circumferentially during the travel of the conveying means at a point above the bases of the crowns, means for adjusting the knives toward and away from the crowns, a plurality of sets of spaced stripping hooks arranged upon the frame for engaging the crowns on the opposite sides thereof inward of the circumferentially cut portions thereof for stripping the same, and means for adjusting the hooks toward and away from said crowns.

15. A machine for preparing pineapple crowns for planting comprising a frame, means supported upon the frame for conveying the pineapple crowns through the machine, a plurality of spaced rotatable cylinders mounted upon said crown conveying means, means for rotating the cylinders for a portion of the length of the travel of said conveying means, means for locking the crowns within the cylinders for rotation therewith, stationary longitudinally extending knives arranged to engage the crowns during the rotation thereof and a point above the bases thereof for cutting the same circumferentially, means for cutting off the bases at a point below the circumferential cut portions thereof, and a plurality of sets of spaced hooks for engaging the crowns below the circumferential cut portions thereof.

16. A machine for preparing pineapple crowns for planting comprising a frame, a conveyor supported by the frame for movement longitudinally thereof, a plurality of rotatable cylinders mounted at spaced points on the conveyor for receiving the pineapple crowns, means normally holding the cylinders against rotation in one direction, means for rotating the cylinders in the other direction during a portion of the travel of said conveyor, pivoted clamping members carried by the cylinders for gripping the crowns, means normally tending to spread said gripping members, means for moving the members into gripping contact with the crowns prior to the start of rotation thereof, means for releasing the members from gripping contact at the end of the rotation thereof, means for cutting the bottoms from off of the crowns including a transversely extending knife carried by the frame and arranged in the path of said pineapple crowns, a longitudinally extending knife arranged upon the frame at the point of rotation of said crowns for cutting the crowns circumferentially, and spaced hooks arranged upon the frame inward of said longitudinally extending knife for stripping the crowns below the circumferential cut.

17. A machine for preparing pineapple crowns for planting comprising a support, a conveyor arranged upon the support for travel longitudinally thereof, a plurality of spaced supporting blocks forming a part of the conveyor, a rotatable cylinder carried by each block for receiving a pineapple crown, means for preventing rotation of the cylinders in one direction, means for rotating the cylinders in the opposite direction during a portion of the travel of the conveyors, a pair of clamping jaws carried by each cylinder arranged to extend diametrically across the same for engaging the pineapple crowns, means normally tending to spread the jaws and hold the same in an open position, means for moving the jaws into gripping contact with the crowns prior to the rotation of the cylinders, means for locking the jaws in gripping contact during rotation of the cylinders, means including a transversely extending knife arranged in the path of the crowns for cutting off the bottom thereof, a longitudinally extending knife supported by the frame for engaging the crowns during the rotation thereof for cutting the same circumferentially, adjustable hooks arranged below the knife supported by the frame and movable toward and away from the active edge of the longitudinally extending knife and mounted below the same for stripping the crowns below the circumferential cut made therein and means for releasing the pairs at the termination of the rotation of said cylinders.

18. A machine for preparing pineapple crowns for planting comprising a frame, a conveyor supported upon the frame for movement longitudinally thereof, a plurality of transversely extending blocks mounted upon and forming a part of the conveyor, a rotatable cylinder carried by each block, a ring gear carried by each cylinder, a longitudinally extending rack bar carried by the frame and disposed in the path of said ring gear for a portion of the length of the travel of said conveyor for rotating the cylinders within the blocks, and a pair of pivoted jaws carried by each cylinder arranged to extend diametrically across the same when in their clamping position, spring means normally holding the jaws in an open nonclamping position, means for moving the jaws to their clamping positions prior to engagement of the ring gears with the rack bar, means for locking the jaws in their clamping position, means for severing the bottoms of the crowns prior to the rotation of the cylinders, a longitudinally extending cutting knife carried by the frame and disposed in spaced parallel relation to the rack bar for engaging the crowns during the rotation thereof at a point spaced from their lower ends for cutting the same circumferentially, a plurality of hooks mounted upon the frame for engaging the crowns during the rotation thereof disposed below the knife for stripping the crowns, and means for releasing the jaw locking means at the termination of the rotation of said cylinders for releasing said crowns.

19. A machine for preparing pineapple crowns for planting comprising a frame, a conveyor supported upon the frame for movement longitudinally thereof including a pair of spaced endless conveyor chains and a plurality of transversely extending supporting blocks secured to the chains, a rotatable cylinder carried by each block, a ring gear carried by each cylinder, a rack bar supported by the frame and arranged in the path of the ring gears for a portion of the length of travel of the conveyor for rotating said cylinders, a pair of pivoted gripping jaws carried by each cylinder arranged to extend diametrically across the same when in their closed positions, means normally tending to hold the jaws in an open non-gripping position, means arranged in advance of the rack bar for moving the jaws to their closed position, means for locking the jaws in their closed position, a transversely extending knife arranged inward of the blocks for engaging the bases of the crowns for trimming the same, a longitudinally extending knife mounted upon the frame in spaced parallel relation to the rack bar for engaging the crowns at a point spaced from the bases thereof during the rotation thereof for forming a circumferential cut therein, a plurality of spaced stripping hooks disposed below the knife for cutting the crowns circumferentially mounted upon said frame for stripping the crowns below said circumferential cut and means for releasing said jaw locking means at the end of the rack bar.

20. A machine for preparing pineapple crowns for planting comprising a frame, rotatable shafts arranged at each end of the frame, means for rotating one of said shafts, pairs of sprocket wheels upon said shafts for rotation therewith, spaced sprocket chains of endless construction trained about said sprocket wheels, transversely alined blocks carried by said links of the chains, transversely extending supporting blocks secured to the blocks carried by the chains, each of said supporting blocks having an axial opening therein, a cylinder rotatably mounted in each opening, a ring gear carried by each cylinder, a longitudinally extending rack bar carried by the chain extending a portion of the length of the travel of the conveyors and arranged in the path of the ring gears for rotating the cylinders, a pivoted pawl carried by each supporting block for engaging the ring gears to prevent the ring gears from rotating in one direction, means carried by each cylinder for gripping a pineapple crown, and means for cutting and stripping the pineapple crowns during the rotation of said cylinders.

21. A machine for preparing pineapple crowns for planting comprising a supporting frame, arranged upon the frame for movement longitudinally thereof, a plurality of rotatable cylinders carried by the conveyor, means for rotating the cylinders for a portion of the travel of the conveyor, means for gripping pineapple crowns within the cylinders during the rotation thereof, means for cutting the crowns circumferentially at a point spaced from the bases thereof including a knife having a pair of longitudinally extending blades adjustably mounted upon the frame gradually diverging toward their cutting ends and means arranged below the knives for stripping the crowns below the knives including a plurality of superimposed sets of hooks arranged in spaced relation throughout the lengths of the knives.

22. In a machine for preparing pineapple crowns for planting, a frame, a conveyor supported by the frame and arranged to travel longitudinally thereof, rotatable pineapple crown gripping means carried by the conveyor, means for rotating said pineapple crowns gripping means, means for cutting the crowns circumferentially at a point spaced from the bases thereof including a supporting plate housed by the frame and a pair of spaced longitudinally extending blades adjustably mounted upon the plate toward and away from the longitudinal center of the frame, the blades gradually diverging toward their inner free ends, and means for stripping the crowns during the rotation of the pineapple gripping means including a plurality of sets of superimposed hooks adjustably mounted upon said plates below said knives.

23. In a pineapple crown trimming and peeling machine, a frame, a horizontally supporting plate arranged upon the frame, means for conveying the pineapple crowns past said plate, a knife arranged below the plate including a pair of longitudinally extending blades, the blades gradually diverging toward their free inner ends and outwardly extending shanks formed on the blades having slots formed therein, holding bolts extending through the slots and said supporting plates and stripping means mounted below the knife including a plurality of sets of superimposed hooks, a holding bolt carried by said supporting plate and extending through said sets of hooks, the plate inward of the holding bolt having an arcuate slot, and an adjusting bolt extending through said sets of hooks mounted in said arcuate slot.

24. In a machine for preparing pineapple crowns for planting, means for stripping the crowns including a plurality of sets of superimposed hooks, each of said hooks embodying a flat shank and laterally extending arcuate stripping prongs, one of said prongs being arranged at an angle to the other prongs.

25. In a machine for preparing pineapple crowns for planting, a frame, a conveyor arranged upon the frame for movement longitudinally thereof, a plurality of supporting blocks carried by the conveyor, a rotatable cylinder supported by each block, means for rotating the cylinder for a portion of the length of travel of said conveyor, a pair of pineapple crown gripping jaws carried by each cylinder and arranged to extend diametrically across the same when in their closed positions, spring means normally holding the dogs in an open non-gripping position, a guide track arranged in advance of the cylinder rotating means for moving the jaws to a closed gripping position, means carried by each cylinder for holding the jaws in a locked position, and a trip for releasing said locking means arranged at the end of the cylinder rotating means.

26. In a machine for preparing pineapple crowns for planting, a frame, an endless conveyor carried by the frame for movement longitudinally thereof, a plurality of rotatable cylinders arranged upon the conveyor, a pair of pineapple crown gripping jaws pivotally secured to each cylinder, means normally tending to hold the jaws in an open non-pineapple crown gripping position, means for rotating the cylinder during a portion of length of travel of the conveyor including a longitudinally extending rack bar, a pair of guide tracks arranged in the path of the rack bar for moving the jaws to a closed pineapple crown gripping position, each of the jaws including overlapping arms when the jaws are in their closed position, and a sliding bolt adapted to extend between the arms for normally holding the jaws in a locked position, a sliding bolt operating member carried by the cylinder, a pivoted dog for normally holding the bolt operating member against movement, a trip arranged in the path of the dog and disposed in advance of the rack bar for actuating and moving the same out of engagement with the bolt operating member, and a second trip disposed at the end of the rack bar for actuating said bolt operating member for moving the bolt out of engagement with said arms of the jaws.

27. In a pineapple crown trimming and stripping machine, a rotatable cylinder, a pair of jaws pivotally mounted upon the cylinder at one of the ends thereof, arcuate jaw faces formed on the jaws intermediate the ends thereof, arcuate overlapping arms formed on the free ends of the jaws, a sliding bolt carried by the cylinder at a point diametrically opposite the pivot point of the jaws for engaging between said arms when the jaws are in their closed position for preventing accidental opening movement thereof, spring means normally tending to move the jaws to an open position, a head formed on said bolt, an arcuate bolt operating member slidably mounted upon the cylinders having an inclined face for normally engaging the head of the bolt, a spring normally urging the bolt operating member in one direction for permitting inward movement of the bolt in its locked position, a pivoted dog carried by the cylinder arranged to engage the toothed end of the bolt operating member for holding the same against the tension of said spring means and the spring against locking movement, means for releasing the dog for permitting inward movement of the bolt to its locking position, and a trip for engaging the bolt operating member at a point spaced below said dog operating member for moving the bolt operating member inwardly to release said bolt from out of engagement with the arms of the jaws.

28. In a pineapple crown trimming and stripping machine, a rotatable drum, a plurality of rotatable cylinders mounted upon the drum for receiving the pineapple crowns, means for rotating the cylinders at a portion of rotation of said drum, pineapple crown gripping members carried by each cylinder, means for holding the gripping members in contact with the crowns during the rotation of the cylinder, and means carried by said cylinders for cutting and trimming the crowns during the rotation thereof.

29. In a pineapple crown trimming and stripping machine, a rotatable drum, a plurality of rotatable cylinders mounted upon the drum, means for rotating the cylinders during a portion of rotation of said drum, means for holding the crowns within the cylinders against rotation therein during movement of the cylinder, and means carried by said cylinders for cutting and trimming the crowns during rotation of said cylinders.

30. A machine for preparing pineapple crowns for planting comprising means for conveying the pineapple crowns through the machine, means for cutting the crowns circumferentially during the travel of the crowns through the machine, and means for stripping the crowns between the circumferential cuts during the cutting operation and the travel of the crowns through the machine.

31. A machine for preparing pineapple crowns for planting comprising a frame, means supported upon the frame for conveying the crowns through the machine, means for releasably locking the pineapple crowns upon the conveying means during a portion of the travel of said conveyor, means for trimming off the bases of the crowns initially at the start of the travel of the conveying means, knives arranged in rear of the base trimming knife for cutting the crowns at spaced points circumferentially, and means for stripping the crowns between the circumferential cuts.

32. A machine for preparing pineapple crowns for planting comprising a frame, means for conveying the pineapple crowns through the machine, a plurality of clamping jaws carried by said conveying means for gripping the pineapple crowns, means for releasably holding the clamping jaws in engagement with the pineapple crowns for a portion of the travel of said conveying means, means for cutting off the bases of the pineapple crowns during travel of the conveying means, means for cutting the crown circumferentially at a point above the bases thereof, and means for stripping the crowns between the bases thereof and said circumferential cuts.

33. A machine for preparing pineapple crowns for planting comprising a frame, means for conveying the pineapple crowns through the machine, rotatable cylinders mounted upon the conveying means for receiving the crowns, clamping jaws carried by the cylinders for holding the crowns within the cylinders, releasable means for locking the jaws in engagement with the crowns for a portion of the travel of said conveying means, and means for cutting and stripping the crowns in the cylinders while the crowns are locked therein and during the travel of the conveying means through the machine.

34. A machine for preparing pineapple crowns for planting comprising a frame, means supported upon the frame for conveying the crowns through the machine, a plurality of spaced rotatable cylinders carried by said conveying means for receiving the pineapple crowns, means for rotating said cylinders during a portion of the travel of said conveying means through the machine, means for releasably locking the crowns within the cylinders during the rotation thereof, means for preventing retrograde movement of said cylinders, and stationary cutting knives and stripping hooks carried by the frame for engaging the crowns during travel of the crowns through the machine.

35. A machine for preparing pineapple crowns for planting comprising a frame, means supported upon the frame for conveying the crowns through the machine, a plurality of spaced rotatable cylinders mounted upon said conveying means for receiving the crowns, means for rotating said cylinders for a portion of the length of travel of said conveying means, means for locking the crowns in the cylinders during the rotation of the cylinders, means for cutting off the bases of the crowns, longitudinally extending knives disposed inward of the cylinders for cutting the crowns circumferentially during the travel of the conveying means, at a point above the bases of the crowns, means for adjusting the knives toward and away from the crowns and means for stripping the crowns between the bases and said circumferential cuts on the crowns.

36. A machine for preparing pineapple crowns for planting comprising means supported upon the frame for conveying the crowns to the machine, a plurality of spaced rotatable cylinders mounted upon said conveying means for receiving the crowns, means for rotating said cylinders for a portion of the length of travel of said conveying means, means for locking the crowns in the cylinders during the rotation of the cylinders, means for trimming off the bases of the crowns, longitudinally extending knives disposed inward of the cylinders for cutting the crowns circumferentially during the travel of the conveying means at a point above the bases of the crowns, a plurality of sets of spaced gripping hooks arranged upon the frame for engaging the crowns on the opposite sides thereof inward of the circumferential cut portions for stripping the crowns, and means for adjusting the hooks toward and away from said crowns.

37. A machine for preparing pineapple crowns for planting comprising a frame, a conveyor supported by the frame for movement longitudinally thereof, a plurality of rotatable cylinders mounted at spaced points on the conveyor for receiving the pineapple crowns, means normally holding the cylinders against rotation in one direction, means for rotating the cylinders in the opposite direction during a portion of the travel of said conveyor, pivoted clamping members carried by the cylinders for gripping the crowns, means normally tending to spread said gripping members, means for moving the members into gripping contact with the crowns prior to the start of rotation thereof, means for releasing the members from gripping contact at the end of the rotation thereof, and means arranged between the member closing means and the member releasing means for cutting and stripping the crowns during the travel of the crowns through the said machine.

38. A machine for preparing pineapple crowns for planting comprising a support, a conveyor arranged upon the support for travel longitudinally thereof, a plurality of spaced supporting blocks forming a part of the conveyor, a rotatable cylinder carried by each block for receiving the pineapple crown, means for preventing rotation of the cylinders in one direction, means for rotating the cylinders in the opposite direction during a portion of the travel of the conveyor, a pair of clamping jaws carried by each cylinder arranged to extend diametrically across the same for engaging the pineapple crowns, means normally tending to spread the jaws and hold the same in an open position, means for moving the jaws into gripping contact with the crowns prior to the rotation of the cylinders, means for locking the jaws in gripping contact during rotation of the cylinders, and means arranged between the jaw closing means and the jaw releasing means for cutting and stripping the crowns during the travel of the crowns through the machine.

39. A machine for preparing pineapple crowns for planting comprising a frame, a conveyor supported upon the frame for movement longitudinally thereof, a plurality of rotatable cylinders carried by the conveyor, a ring gear carried by each one of the cylinders, a longitudinally extending rack bar carried by the frame disposed in the path of said ring gears for a portion of the length thereof for rotating the cylinders on the conveyor, a pair of pivoted jaws carried by each cylinder arranged to extend diametrically across the same when in their clamping position, spring means normally holding the jaws in an open non-clamping position, means for moving the jaws to their clamping positions prior to engagement of the ring gears with the rack bar, means for locking the jaws in their clamping positions, and means for releasing the jaw locking means at the termination of the rotation of said cylinders for releasing the crown, and means for acting upon the crown for trimming and stripping the same during the rotation of said crowns.

40. A machine for preparing pineapple crowns for planting comprising means for conveying the pineapple crowns through the machine, and means for trimming the crowns.

41. A machine for preparing pineapple crowns for planting comprising pineapple crown conveying means, means for automatically locking the crowns upon the conveying means, means for automatically releasing the crowns at a predetermined time from the conveying means, and means for trimming the crowns.

42. A machine for preparing pineapple crowns for planting comprising a support, an endless conveyor on the support for receiving crowns, and means for trimming the crowns on the conveyor.

43. A machine for preparing pineapple crowns for planting comprising a support, a drum rotatable on the support, pineapple crown receiving means on the drum, and means for trimming the crowns on the drum.

44. A machine for preparing pineapple crowns for planting comprising a support, a drum rotatable on the support, means for clamping the crowns on the drum, and means for trimming the crowns while the same are clamped to the drum.

45. A machine for preparing pineapple crowns for planting comprising a rotatable drum, means for automatically clamping the crowns on the drum, means for automatically releasing the clamping means after a predetermined interval, and means for trimming the crowns.

46. A machine for preparing pineapple crowns for planting comprising a support, a drum rotatable on the support, means for rotating the drum, rotatable cylinders carried by the drum, normally opening pineapple crown clamping receiving jaws secured to the drum, means for moving the jaws to crown clamping position, means for rotating the cylinders about the crowns, and means for trimming the crowns during rotation of the cylinders.

47. A machine for preparing pineapple crowns for planting comprising a drum, means for rotating the drum, a plurality of rotatable cylinders carried by the periphery of the drum, means for rotating the cylinders during rotation of the drum, normally open pineapple crown clamping jaws secured to the drum, means for moving the jaws to crown clamping position, and trimming means carried by the cylinders for engaging the crowns during rotation of the cylinders.

48. A machine for preparing pineapple crowns for planting comprising a support, a drum rotatable on the support, means for rotating the drum, rotatable cylinders carried by the periphery of the drum, normally open pineapple crown clamping jaws secured to the drum, means for moving the jaws to crown clamping position, means for rotating the cylinders about the crowns including a stationary rack carried by the support and ring gears engaging the rack bars carried by the cylinders, and crown trimming means carried by the cylinders.

49. A machine for preparing pineapple crowns for planting comprising a support, a drum rotatable on the support, means for rotating the drum, rotatable cylinders carried by the periphery of the drum, normally open pineapple crown clamping jaws secured to the drum, means for moving the jaws to crown clamping position, means for rotating the cylinders about the crowns, crown trimming means carried by the cylinders, and means for moving the crown trimming means into and out of operative position relative to the crowns.

50. A machine for preparing pineapple crowns for planting comprising a support, a drum rotatable on the support, means for rotating the drum, a plurality of rotatable cylinders carried by the periphery of the drum, normally open pineapple crown clamping means secured to the drum, means for automatically moving the clamping for automatically moving the clamping means to pineapple crown gripping position, means for rotating the cylinders about the crowns, crown trimming means carried by the cylinders, means for automatically moving the trimming means into and out of crown engaging position including stationary shafts carried by the cylinders and disposed on opposite sides thereof, rotatable hollow shafts mounted upon the stationary shafts, cutting knives and hooks connected with the hollow shafts, gears connected to the hollow shafts, and rack bars carried by the support at spaced points arranged in the path of said gears.

In testimony whereof I affix my signature.

TAKEO SATO.